March 17, 1931.  W. A. SMITH  1,797,027

VALVE FOR USE WITH DUST EXTRACTION AND FOR CONVEYING APPARATUS

Filed Jan. 4, 1927

Inventor:-
William Allen Smith.

By his Attorney:- Walter Gunn

Patented Mar. 17, 1931

1,797,027

UNITED STATES PATENT OFFICE

WILLIAM ALLEN SMITH, OF MANCHESTER, ENGLAND, ASSIGNOR TO PNEUMATIC CONVEYANCE & EXTRACTION (1929) LIMITED, OF LONDON, ENGLAND, A COMPANY OF GREAT BRITAIN

VALVE FOR USE WITH DUST EXTRACTION AND FOR CONVEYING APPARATUS

Application filed January 4, 1927, Serial No. 159,001, and in Great Britain March 17, 1926.

This invention refers to a new or improved construction of valve for use with dust extraction and/or conveying apparatus.

One of the objects and features of the invention is a rotary valve which when fully open presents an orifice which is equal to the full bore of the piping with which the valve is used, and therefore, leaves no shoulders against which the dust may lodge and act abrasively. A further object and feature of the invention is a casing and a lining therefor whereby the valve may rotate freely without leakage of air and without undue wear, the lining being also applied in a manner which allows of easy renewal.

A valve for use with dust extraction and/or conveying apparatus made in accordance with this invention comprises a body having a cylindrical bore, a cylindrical liner therein, a cylindrical valve in the liner and end plates securing both the valve and the liner within the body. The improved valve may be characterized in that such end plates form a seal between the valve and the body, and between the valve and the liner, and may be further characterized in that the parts are symmetrical so that the valve may be inserted within the body in either position or from either end.

The accompanying drawing illustrates one form of valve made in accordance with this invention, in which:—

Figure 1:
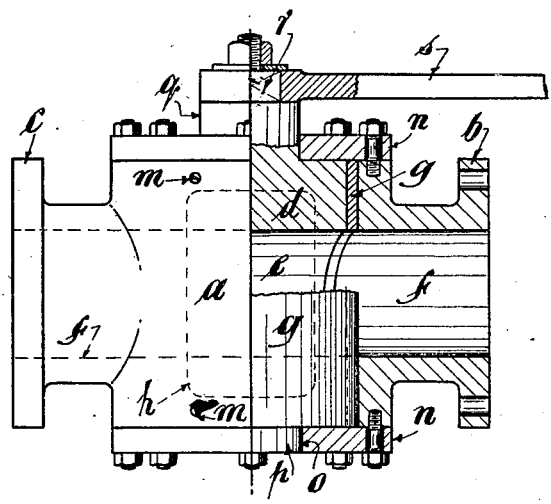
Fig. 1 is a part sectional longitudinal elevation.
Figure 2:
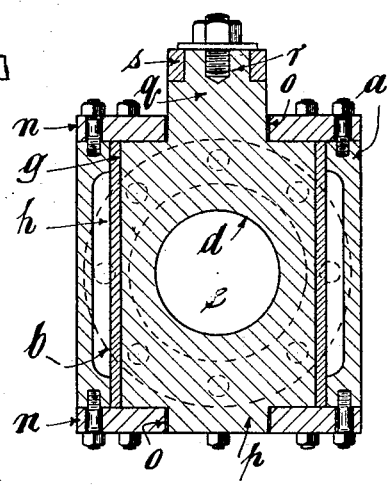
Fig. 2 is a cross sectional elevation.
Figure 3:
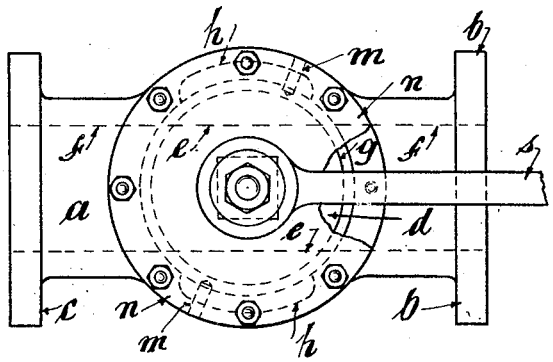
Fig. 3 is a plan.

As shown, the improved valve comprises a body or casing $a$ which is substantially cylindrical and parallel sided, except for the two flanged inlet and outlet pipe connections $b$ and $c$ respectively. The valve proper $d$ is also parallel sided and is formed with a through transverse port $e$ equal in diameter to that of the bore $f$ of the inlet and outlet pipe connections, and the piping with which the valve is used. Between the valve $d$ and valve casing $a$ is arranged a machined liner $g$ which may be cast iron, brass or gun metal, and which may be impregnated with graphite or the like, for the purpose of lubricating the valve when rotated.

The inner face of the valve casing $a$ is recessed at $h$ to allow of clearance between the liner $g$ and itself, there being two recesses extending partially around the casing and also extending to points near to the top and bottom ends of the casing, so as to allow of the easy fitting of the liner and its easy removal when necessary. The liner $g$ may be held in position by being a fairly tight fit within the casing and also by means of grub screws $m$.

The valve $d$ is prevented leaving the valve casing by means of discs or end plates $n, n$ bolted to the top and bottom faces of the casing respectively, each disc having a central orifice $o$ into which in the case of the bottom disc, a small central boss $p$ on the valve fits, and through which in the case of the top disc, the stem $q$ of the valve projects, said stem at its upper end $r$ being made square and fitted with a handle $s$ for rotating the valve.

The end securing plates provide an extra seal for the valve between it and the body and between it and the liner as all these parts are machined flush as shown in the drawing. If desired a sheet of suitable packing material may be used between the end plates and the valve, which material may be impregnated to provide lubrication and to improve its wearing and sealing properties.

With the valve and valve casing cylindrical, the valve could, if desired, be inserted from either end of the casing. The improvements may also be applied to three-way and four-way valves.

The construction besides providing an efficient and serviceable valve facilitates repairs in that when worn the valve may be ground or lightly turned up and a new and slightly thicker liner made to fit.

What I claim is:—

1. A valve for use with pneumatic conveying apparatus comprising a body part having a main cylindrical bore with flat end faces and a smaller and intersecting transverse cylindrical bore or passage; a rigid cylindrical liner in the said main bore, of the same length and with coincident flat end faces and lateral holes of the same size as, and registering with, the said intersecting transverse bore; a solid valve, rotatably fitting on the liner, having a plug part of the same length as the liner with flat end faces to coincide with those on the liner and a transverse through hole adapted to register with those in the liner to provide an uninterrupted through passage of uniform diameter; and flat end plates secured to the body part and engaging the flat end faces of the liner and valve so as to locate the parts axially only and to seal the ends of the cylindrical joints thereof, as set forth.

2. A valve, for use with pneumatic conveying apparatus, according to claim 1 characterized in that the main bore of the valve is provided with lateral clearance portions facilitating the insertion and fitting of the liner, as set forth.

In testimony whereof I have signed my name to this specification.

WILLIAM A. SMITH.